Sept. 10, 1935.  H. G. COX  2,014,103
IMPULSE COUPLING
Filed June 28, 1933  3 Sheets-Sheet 2
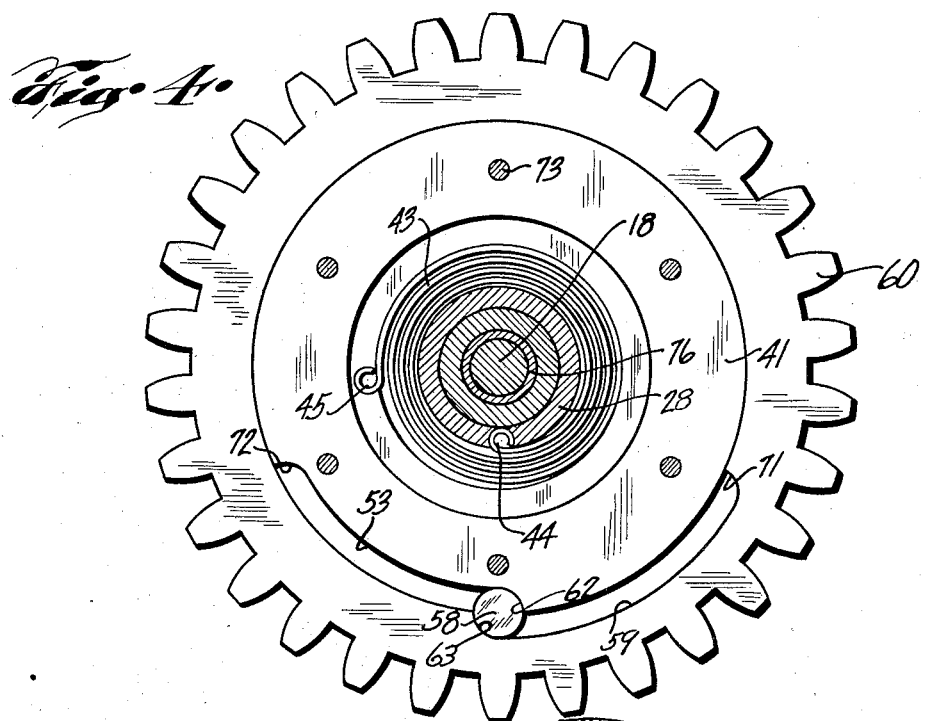
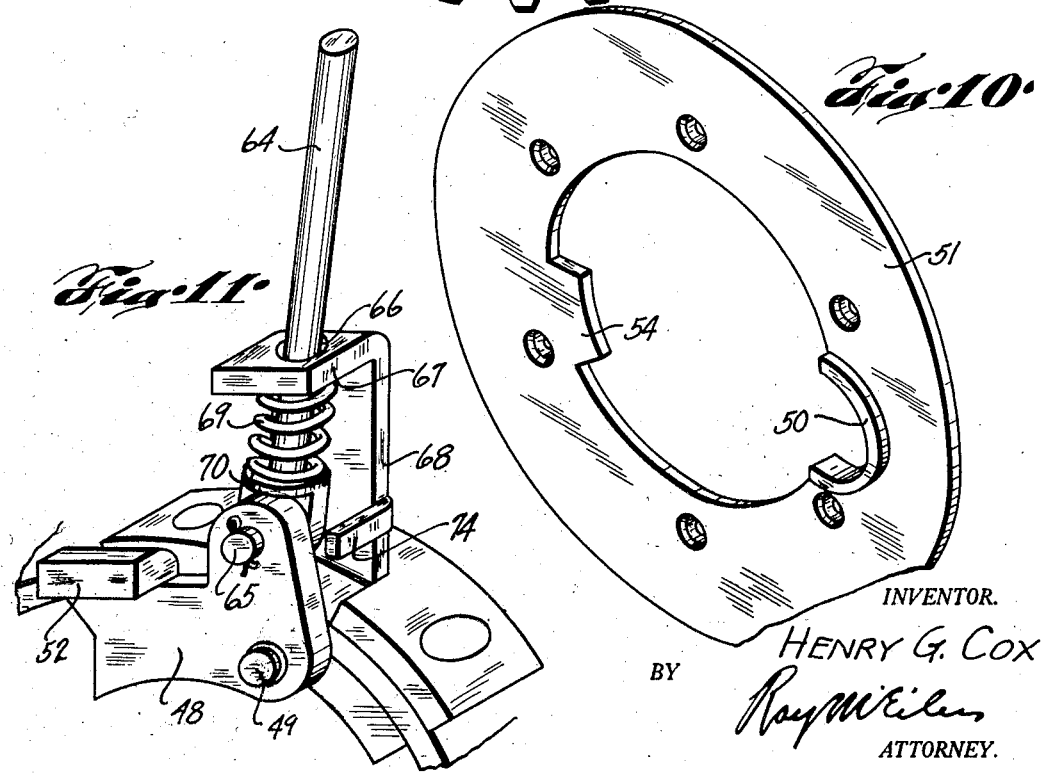
INVENTOR.
HENRY G. COX
BY
Roy M Eiler
ATTORNEY.

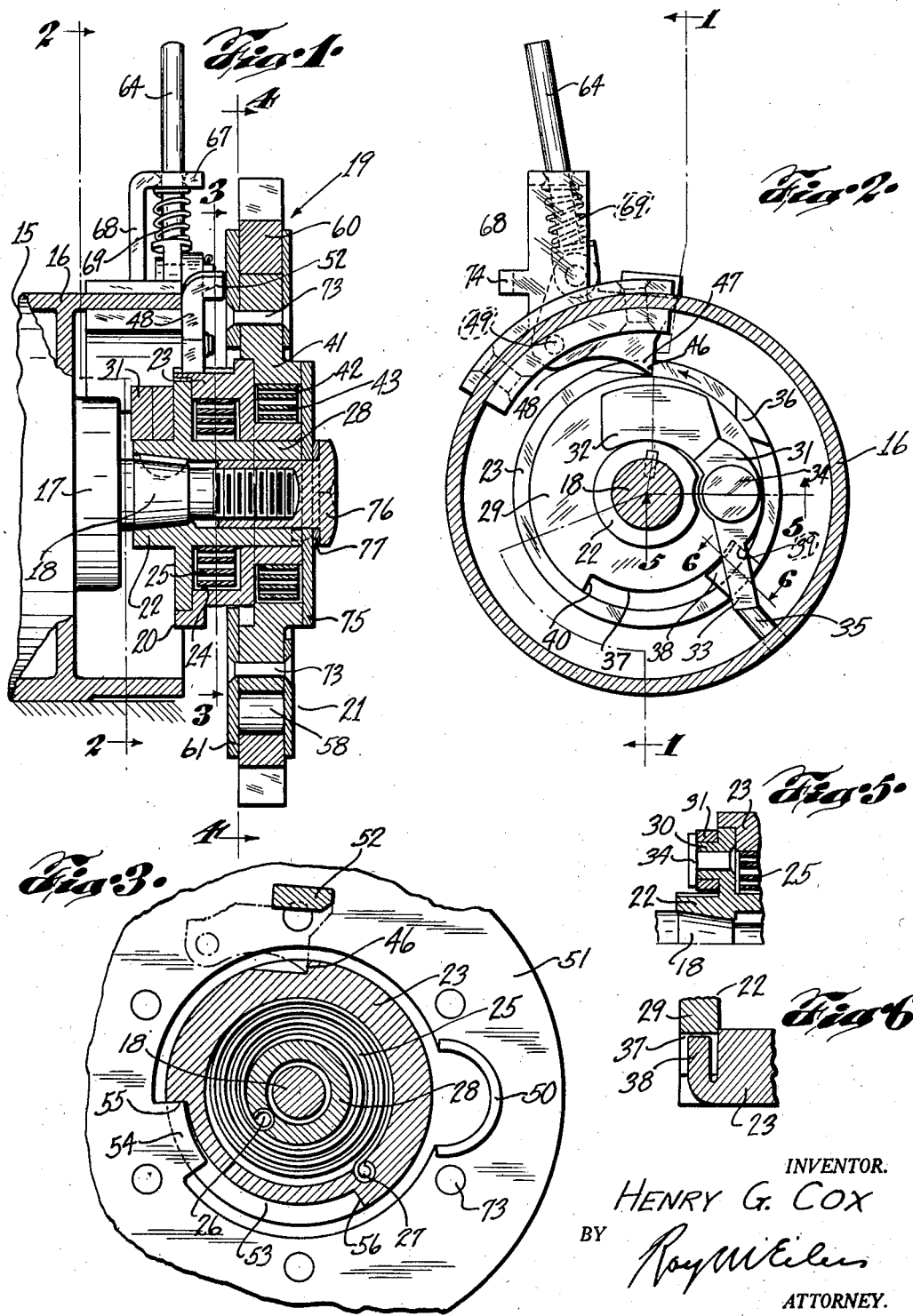

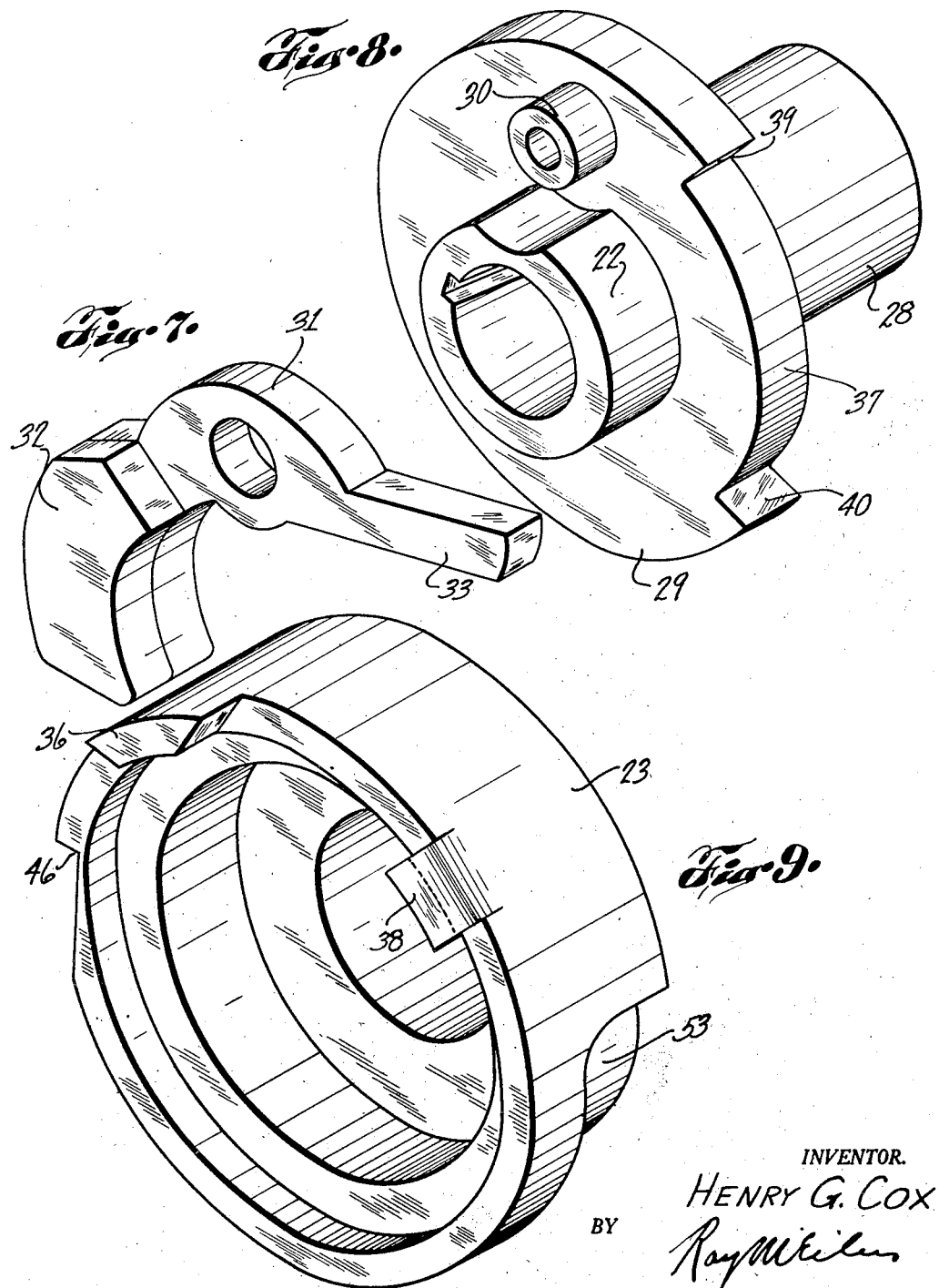

Patented Sept. 10, 1935

2,014,103

UNITED STATES PATENT OFFICE 2,014,103

IMPULSE COUPLING

Henry G. Cox, Beloit, Wis., assignor to Fairbanks, Morse & Company, Chicago, Ill., a corporation of Illinois Application June 28, 1933, Serial No. 677,996

12 Claims. (Cl. 123—149)

This invention relates to improvements in impulse couplings, and more particularly to those used in connection with magnetos or electric generators for supplying the ignition current to internal combustion engines.

Some applications of impulse couplings require the magneto to supply an ignition spark in either direction of rotation, for example, certain types of single cylinder engines require the magneto to rotate clockwise for starting, and anticlockwise for normal running, or vice versa. Such a condition could not be met by the older prevailing types of impulse couplings, without rearranging certain of the parts thereof, or by providing "left" and "right" hand parts, necessitating, in either case, dismantling and reassembly of the parts of the coupling when it is desired to change the direction of rotation in which the coupling is effective. Such older prevailing couplings are, therefore, undesirable and inadequate for service in both directions of rotation. It is, therefore, an object of the present invention to provide an improved impulse coupling of reversible type which fulfills the requirements above noted, without necessitating disassembly of the coupling.

A further object is attained in an improved impulse coupling of reversible type, which is simple and sturdy in construction, and reliable in operation.

Further objects and advantages will appear from the following detailed description of parts and the accompanying drawings, in which:

Fig. 1 is a sectional elevation of a preferred form of impulse coupling which is suitably connected to an electric generator, the section being taken along line 1—1 in Fig. 2; Figs. 2, 3, and 4 are sections taken, respectively, along lines 2—2, 3—3 and 4—4 of Fig. 1; Fig. 5 is a fragmentary section taken along line 5—5 in Fig. 2; Fig. 6 is an enlarged fragmentary section taken along line 6—6 in Fig. 2; Figs. 7, 8, 9, and 10 are, each, enlarged oblique views of certain parts of the improved coupling, and Fig. 11 is an enlarged oblique view of a preferred form of pawl-actuating mechanism employed in connection with the coupling.

Referring by characters of reference to the drawings, the numeral 15 designates, generally, a fragmentary end portion of a preferred form of magneto or electric generator, which includes a casing or frame 16, a rotor 17, and a rotary shaft 18. Operatively connected to this shaft is a novel form of impulse coupling assembly indicated, generally, at 19 and which comprises a pair of interconnected, individually operable coupling units 20 and 21. The coupling assembly constitutes an operative connection from, say, a magneto drive gear, and the magneto shaft. Coupling unit 20 includes a driven sleeve or hub member 22 which is suitably secured, as by a key, to the shaft 18, and an intermediate driving and driven member 23 which is, by preference, supported for limited rotational movement, on a portion of the member 22. These members are, by preference, so formed and arranged as to provide an annular chamber 24 for housing a spring 25 which is preferably of flat, coiled type, and which is securely attached at its opposite ends 26 and 27, respectively, (Fig. 3), to members 22 and 23. This spring is normally under sufficient restraint to provide for practically rigid driving connection between the members 22 and 23, so that when the member 23 is rotated clockwise (Fig. 2), the member 22 will rotate therewith.

The sleeve portion of member 22 is indicated at 28 (Fig. 8), the sleeve being enlarged, intermediate its ends, to form an annular flange 29 having a lug 30 projecting from a face thereof. A pawl member 31 (Figs. 2 and 7), is pivotally secured, intermediate a weighted end portion 32 and a lever end 33, by means of a headed pin 34, on the lug 30. When the coupling unit 20 is rotated clockwise (Fig. 2), the end portion 33 of the pawl 31 is brought into locking engagement with an abutment 35, which is securely attached to the stationary casing 16 of the magneto, so that the member 22 and associated parts are, as shown in Fig. 2, precluded from further clockwise movement. Continued clockwise rotation of the member 23, relative to the member 22, places the spring 25 under tension until a cam extension 36 formed on the member 23 engages the end 33 of the pawl 31 to force the pawl out of engagement with the abutment 35. Now the spring 25, being under tension due to the continued forward movement of the member 23 and the momentary checking of the member 22, then throws the driven member 22 rapidly forward, giving the rotor 17 of the magneto the necessary sharp impulse to generate the ignition spark.

In order to maintain these relatively movable drive and driven members in proper timed relation, the flange 29 of the member 22 is, by preference, provided with a recessed portion 37 (Figs. 2, 6, and 8) which receives, in lost-motion relation, a projection 38 formed on the member 23, the projection being held, under the normal restraint of the spring 25, in contact with an abutment portion 39 of the recess 37 (Fig. 2). However, during the stop periods of the driven member 22, the projection 38 moves with the drive member 23 toward an abutment 40 formed by the opposite end of the recess 37, these abutments being so spaced with respect to each other, as to permit the cam extension 36 to release the pawl 31 from abutment 35, before the projection 38 engages the abutment 40. After this occurs, the spring 25 again urges the projection 38 into contact with the abutment 39. Thus a lost-motion connection is provided which serves to maintain these parts in proper timed relation, since the extent of relative angular rotation of the member 23 with respect to the member 22, is predetermined by the spaced relation of the abutments 39 and 40, hence by the length of the slot or recess 37. In addition, when the drive member 23 is turned anticlockwise, or in the direction shown by the arrow in Fig. 2, the projection 38, being held in contact with the abutment 39, serves to provide a positive drive connection for the driven member 22. In this direction of rotation, the coupling unit 20 is ineffective to supply an impulse to the rotor of the magneto, since the end 33 of the pawl rides over the abutment 35 without checking rotation of the driven member 22. It is evident, therefore, that the coupling assembly 20 is only effective to furnish an augmented impulse in a clockwise direction of rotation, (Fig. 2).

The coupling unit 21, as will presently appear, is provided to supply an impulse in the opposite, or anticlockwise direction of rotation of the magneto. This latter coupling unit includes, in common with the unit 20, the driven member 23, and a drive member 41 (Fig. 1) which is, by preference, supported for limited relative rotational movement on a portion of the driven member 23. The drive member 41 may be formed as a part of, or secured to a magneto drive gear, sprocket or the like, which serves as the driving connection to the assembly. These members are, by preference, so formed and arranged as to provide an annular chamber 42 for housing a coiled spring 43 which is securely attached at its opposite ends 44 and 45 (Fig. 4), respectively, to members 23 and 41. This spring is normally under sufficient restraint to provide for practically rigid driving connection between these members, so that when the drive member 41 is turned anticlockwise, the spring 43 will drive the member 23.

A notch 46 (Figs. 2, 3, and 9) is, by preference, formed on a peripheral surface of the driven member 23, for receiving, at times, in locking engagement an apexed end 47 of a pawl member 48 which is pivotally secured, as by a pin 49, to the casing of the magneto. The described interlock occurs when the coupling assembly 21 is rotated anticlockwise (Fig. 2) and results in checking rotation of the driven member 23. The drive member 41 now rotates with respect to the driven member 23 until a cam projection 50 (Fig. 3), engages a projection 52 on the pawl 48 forcing the pawl out of engagement with the notch 46. The cam projection 50 is formed by preference, on a plate 51 (Figs. 1 and 10), which is conveniently secured, as by rivets, to the drive member 41. The spring 43, being under tension as a result of the anticlockwise movement of the drive member 41 relative to the driven member 23, then throws the driven member 23 forward. It will however be seen that the projection 38 on the member 23 is now being held, under the influence of the spring 25, in contact with the abutment 39 on the driven member 22, (Fig. 2). The parts 38 and 39 thus result in a positive driving connection, and the rotor of the magneto is given the necessary sharp impulse to generate the ignition spark, this impulse being positively transmitted, and not cushioned through the spring 25.

In order to maintain the relatively movable members 23 and 41 in proper timed relation, and within a permissible range of angular displacement, the driven member 23 of the coupling 21 is, by preference, provided with a recessed portion or peripheral notch 53 (Fig. 3) for receiving, in lost-motion relation, a projection 54 which is conveniently formed on the plate 51. Normally, this projection is held under the influence of the spring 43 in contact with a stop portion or shouldered abutment 55, at one end of the recess 53. However, during the stop periods of the driven member 23, the projection 54 moves, together with the drive member 41, in the recess toward a shouldered stop 56 formed at the opposite end of the recess 53. These stops are so spaced with respect to each other and the projection 54 as to permit the cam 50 on the drive member 41 to release the pawl 48 from the notch 46 before the projection 54 engages the stop 56. It is evident that by the above provision, the drive and driven members 41 and 23 are maintained in proper timed relation, since the extent of the relative angular movement of the drive and driven members is predetermined by the spacing of the stops incident to the peripheral length of the recess 53. In addition, when the coupling 21 is rotated clockwise (Fig. 3), the projection 54, being held under the influence of the spring 43 in contact with the stop 55, serves to provide a positive drive connection, from the drive member 41 to the coupling unit 20. Thus, the coupling assembly 21 is rendered ineffective to supply an impulse to the rotor of the magneto during clockwise rotation, since the pawl 48 rides in and out of the notch 46 without effecting the rotary movement of the driven member 23. From the foregoing it will be apparent that the coupling assembly 20 supplies the impulse for clockwise rotation, and the coupling 21, for anticlockwise rotation, and that the several stops, projections, etc., heretofore described, prevent any cushioning or impulse-absorbing effect of either coupling, when the other is in service.

The foregoing effect is partly due to the fact that spring 25 of coupling assembly 20 and spring 43 of coupling assembly 21 are of opposite spiral trend, proceeding from their inner points of anchorage, to their outer points of securement; this difference in disposition or construction of the two springs readily appearing from a comparison of Fig. 3 showing the spring of coupling 20, with Fig. 4 showing the spring arrangement of coupling 21. From this relatively reversed relation of the two springs, one thereof is of course stressed or wound in response to clockwise rotation, and the other spring is loaded responsively only to counterclockwise rotation of the driven member.

The drive member 41 of the coupling 21 may be operatively connected in any suitable manner, with an internal combustion engine (not shown), but it is preferred to provide a type of drive presently appearing. The peripheral surface of the drive member 41 is, by preference, provided with a slotted portion 57 (Fig. 4), for receiving a roller 58, which, also, extends into a correspondingly slotted portion 59 formed internally of a ring gear 60, which may be suitably connected, as by a chain, gear or the like (not shown) to the drive shaft of an internal combustion engine. The roller 58 is held in the slotted recesses 57 and 59 by means of plates 51 and 61 (Fig. 1), which are securely attached, as by rivets 73, to opposite faces, respectively, of the drive member 41.

When the engine is rotated slowly, as when cranking by hand, the ring gear 60 is driven anticlockwise (Fig. 4) relative to the drive member 41, until the roller 58 is locked between stop portions 62 and 63 formed, respectively, by slots 57 and 59, to provide a positive drive connection between the gear 60 and the coupling 21. Before the coupling assembly 21 is effective to supply an impulse, the pawl 48 must be manually actuated to its operative position, so that it may engage the notch 46 on the driven member 23. For this purpose, there is provided a control lever 64 (Fig. 11) which is pivotally secured by means of a pin 65 to the pawl 48 so as to form a toggle joint, the control lever being extended through an aperture 66 provided in a flange 67 of a bracket 68 which is secured to the casing of the magneto. A spring 69 is, by preference, mounted on the lever 64 between a collar 70 on the lever, and the under surface of the flange 67 of the bracket. In the position illustrated in Fig. 2, the spring 69 urges the pawl into contact with the peripheral surface of the driven member 23, or in a position to engage the notch 46 on the member 23 for retarding the anticlockwise rotation of the driven member 23 of coupling unit 21. After the pawl 48 falls into the notch 46, the drive member 41 now rotates with respect to the driven member 23 and coupling unit 20, against the force of the spring 43 until the cam 50 forces the pawl 48 out of engagement with the notch 46. The spring 43, being stressed during this period of retardation, then throws the driven member 23, together with the coupling 20 anticlockwise, giving the magneto rotor 17 the necessary sharp initial impulse to generate the starting spark.

Should the engine not start firing, on the first trial, it is evident that the parts of the coupling assembly are in position for subsequent trials, since the spring 69 still urges the pawl 48 into contact with the driven member 23. However, when the engine commences firing, it immediately reverses its direction of rotation, or turns clockwise (Fig. 4). The gear 60 revolves with respect to the driven member 41 until a stop portion 71, provided by the end wall of recess 59, carries the roller 58 into abutting relation with a stop portion 72, at the end of the recess 57, or in the example shown, through approximately 120 degrees of relative movement. Now the gear 60 and coupling assemblies 20 and 21 rotate together until the pawl 31 of the coupling assembly 20 engages the abutment 35, (Fig. 2). The coupling assembly 21, including the driven member 23 of the coupling 20, now rotates with respect to the driven member 22 of the coupling 20 until the cam 36 releases the pawl 31 from the abutment 35. The spring 25, being under tension during this period of retardation, then throws the rotor of the armature clockwise (Fig. 2), giving the necessary impulse to generate the ignition spark during the period of engine acceleration.

As the engine increases in speed, the end 33 of the pawl 31 is urged toward the axis of rotation under the influence of centrifugal force upon its opposite weighted end 32, the end 33 moving inwardly far enough to avoid engaging the abutment 35. At approximately the same speed, the force of the cam 50 striking the under surface of the projection 52 of the pawl 48, is sufficient to pivot the pawl past its toggle center, out of engagement with the notch 46 in the driven member 23, the spring 69 urging the pawl against a stop lug 74 formed on the bracket 68. It will be quite evident that should the speed of the engine decrease below that necessary to generate ignition current, the pawl 31 will again become operative to give the armature the necessary impulse to generate running ignition current at low speeds. However, upon stopping the engine, and then subsequently restarting, it is necessary to return the control lever 64 of the pawl actuating device, to the position shown in Fig. 2.

The coupling units 20 and 21 are, by preference, held in assembled relation on the shaft 18 by means of a plate 75 and a hollow internally threaded nut 76 which threadedly engages the end of shaft 18. The plate 75 is, by preference, suitably secured to the sleeve portion of the driven member 22, as by companion projections and recesses, in addition to a lock washer 77, so as to prevent relative rotation between the sleeve 28 and the plate 75.

It will, of course, be evident that the impulse coupling herein described may be utilized in numerous ways, for instance, it is entirely possible to employ it on reversible engines for supplying an impulse in each direction of rotation. Such a condition would be met without rearrangement of the parts, or any reassembling operations, thus saving considerable time and expense. Further, the improved reversible coupling is neat, compact and sturdy in construction. It will be evident that the provision of the lost motion, positive drive connections between the parts of the coupling units, serves so to relate the two oppositely operating units, so that each functions solely in response to rotation in one direction, and in addition, during the effective impulsing operation of either unit, the other serves as a positive drive connection therefrom, to the magneto rotor.

It will, of course, be understood that the present detailed description of parts and the accompanying drawings relates only to a single preferred executional embodiment of the invention, and that substantial changes may be made in the described construction and arrangement of parts without departing from the full intended scope of the invention defined by the appended claims.

I claim:

1. In combination with a generator and a generator shaft, an impulse coupling carried by the shaft, and including means embodying a spring, for periodically accelerating the shaft in a given direction of rotation, a second coupling operatively associated with the first coupling, and including means embodying a spring normally stressed in a direction opposite the first said spring for periodically accelerating the shaft when rotated in an opposite direction.

2. In an impulse coupling assembly of reversible type, two oppositely related impulse units, a spring for each unit, an anchoring element common to the two springs, and a driving member common to the two units.

3. In combination with a generator and a generator shaft, an impulse coupling mechanism of reversible type operatively associated with the shaft, said mechanism including a driven member, an intermediate member, and a drive member, a spring connecting the driven and intermediate members, a spring connecting said intermediate and drive members, and means adapted to coact with said intermediate member for selectively maintaining said springs inoperative between the members connected thereby.

4. In combination with a generator and a generator shaft, a pair of impulse coupling mechanisms, each including a spring of coiled type, the springs being oppositely wound with respect to the shaft, and thereby each operable to transmit an impulse to the shaft in a direction of rotation opposite that of the other.

5. A reversible impulse coupling assembly for connecting a driving element to the shaft of an electric machine, said assembly including two springs oppositely related to said shaft, and group driving abutments associated with each spring, each group thereof adapted to effect a positive driving connection responsively to impulse actuation of the spring corresponding to the other group.

6. In an impulse coupling of reversible type, including a pair of impulse units, each thereof operable to transmit an impulse in a direction of rotation opposite the other, a drive gear within which one of the units is located, the gear and last said unit being provided with registrable recesses, and a shiftable driving element coacting with said recesses for constituting a lost motion drive between the gear and one unit.

7. In combination with a generator, a shaft therefor, an impulse coupling assembly including two impulse units, each operable exclusively in a direction of rotation opposite to the other, and means providing a driving connection from each unit to the shaft, independently of the other impulse unit.

8. In an impulse coupling assembly of reversible type, a driven shaft, a housing providing two compartments, a spring for each compartment, a connection from one spring to the driven shaft, a drive member, a connection from the other spring to said drive member, and a lost motion connection from a source of driving rotation to said drive member.

9. In combination with a generator, a shaft therefor, an impulse coupling assembly operatively associated with the shaft, said assembly including two reversely disposed impulse units, each angularly displaceable with respect to the other, a spring for each unit, a member providing an anchorage common to the springs of both units, means, including said member, for limiting the range of angular movement of each unit with respect to the other unit, and means for limiting the range of angular displacement of the assembly with respect to said shaft.

10. In an impulse coupling assembly of reversible type, embodying oppositely related springs for selectively interlocking a drive gear and a magneto shaft, a lost motion connection between the drive gear and the assembly, including a displaceable interlocking member, a rotatable drive member provided with a peripheral slot, the drive gear being provided with a companion registering slot, said interlocking member being movably disposed between the registrable slotted portions, whereby to permit angular displacement thereof responsively to reversal of rotation of the driving gear.

11. A driving mechanism for an ignition generator including a rotating element, including a driven member secured to the rotating element, a driving member, an intermediate member operatively associated with the driving and driven members, an accelerating device associated with the driven and intermediate members, including means for causing relative displacement between the intermediate and driven members and for storing energy in the accelerating means, means for first checking and then releasing the displacing means so the accelerating means will act on the driven member, a second accelerating device associated with the driving and intermediate members, and means for rendering said second mentioned accelerating means inoperative, responsively to a given movement of the driving member.

12. An impulse drive unit for an ignition generator having a rotating element, including a driven member secured thereto, a driving member, an intermediate member, an accelerating device associated with said driving and intermediate members, an accelerating device associated with said intermediate and driven members, means for causing, in one direction of rotation, relative displacement of said driving and intermediate members and for storing energy in the first mentioned accelerating device, means for releasing the displacing means whereby the accelerating means will act on the intermediate member, and means for positively connecting the intermediate and driven members together for rendering said second named accelerating device inoperative.

HENRY G. COX.